Aug. 17, 1965  B. GRABOVAC  3,200,632
TORQUE MEASURING DEVICE
Filed May 22, 1962  2 Sheets-Sheet 2
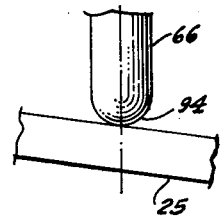
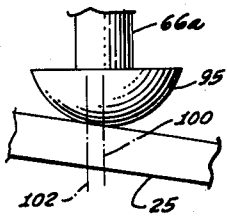
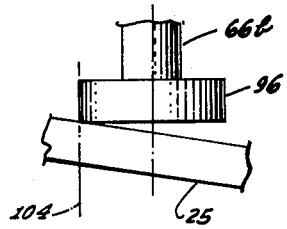
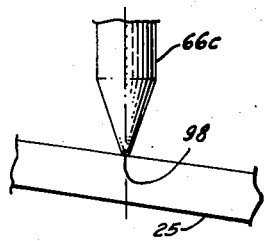
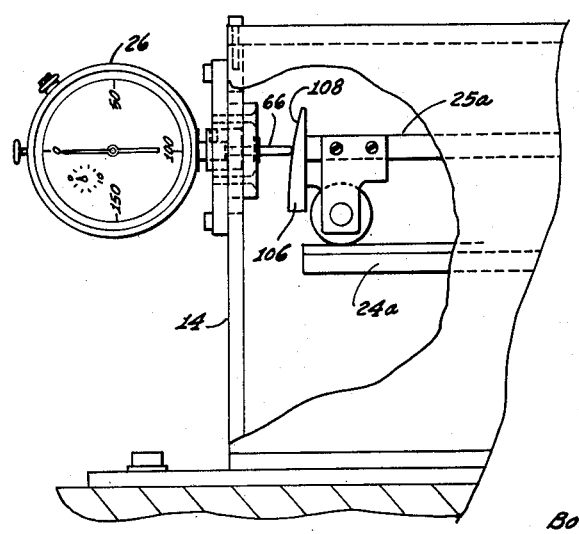
INVENTOR:
Bosko Grabovac
Attorneys

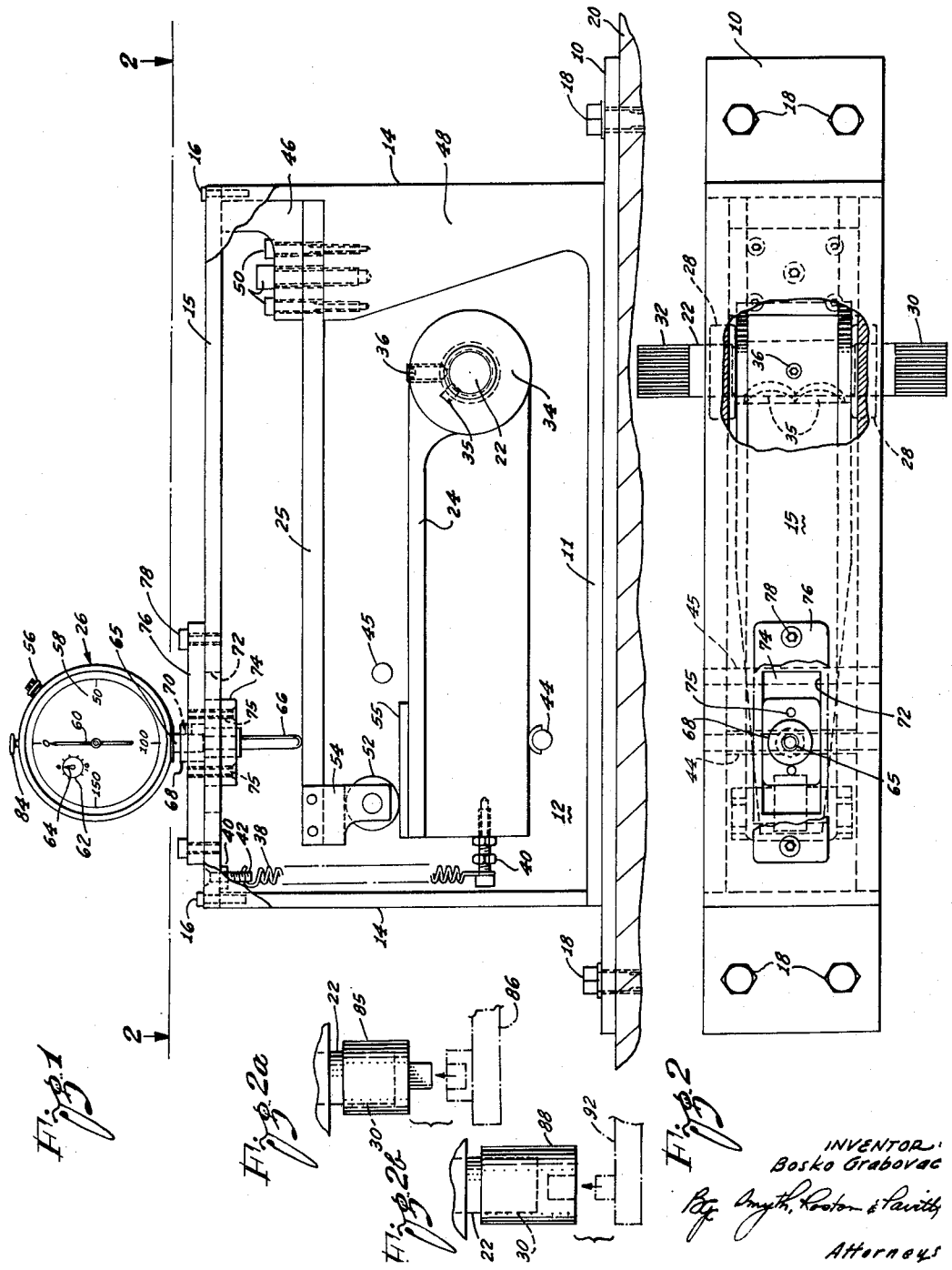

UNITED STATES PATENT OFFICE 3,200,632
Patented Aug. 17, 1965

3,200,632
TORQUE MEASURING DEVICE
Bosko Grabovac, Altadena, Calif., assignor to Torque Controls, Inc., San Gabriel, Calif., a corporation of California
Filed May 22, 1962, Ser. No. 196,747
13 Claims. (Cl. 73—1)

This invention relates to a torque measuring device, and more particularly, refers to a device for testing and calibrating torque indicating devices torque measuring tools, torque limiting tools, and also for testing and calibrating cable tensiometers.

Many different types of torque measuring and testing devices have been developed with various shortcomings and disadvantages. Some torque measuring devices, for example, employ complicated mechanism and are correspondingly costly. Some are not only complicated in structure but also are highly vulnerable to damage and are prone to get out of calibration. One type of torque measuring device employs a pendulum and therefore has the disadvantage that the device must always be level for accurate readings. Most of the torque testing devices heretofore available are awkward to use or make it inconvenient to read torque values when the operator is occupied with the task of applying the torque that is to be measured.

A serious defect of prior art torque measuring and testing devices is vulnerability to damage by shock created by the abrupt ending of a torque load when a torque limiting tool is tested. When a torque limiting tool is used to apply torque of a predetermined magnitude, the torque rises to the breaking point at the predetermined magnitude and then falls off abruptly. The reaction to the abrupt drop in the applied load is especially damaging to rack and gear arrangements that are commonly used in torque indicating mechanisms.

The present invention avoids all of these difficulties by employing a flexible beam to receive the torque loads in combination with a gage of the micrometer-indicator type to measure the flexure of the beam. One important advantage of this basic arrangement is that the flexural response of the beam to applied forces is linear and another advantage of importance is that a relatively heavy beam may be used with a highly sensitive indicator for minimum unit stressing of the beam for a given load range. Such a mechanism is of simple construction and durable for a long service life with unusual capability for maintaining calibration.

In the presently preferred practice of the invention the beam member is generally horizontal and the cooperating indicator gage seats in an aperture in fixed structure immediately above the beam. One advantage of this arrangement is that the indicator gage may be readily turned to face any direction for the convenience of the operator in reading torque values. Another advantage is that it is an extremely simple matter to replace the indicator gage if desired. A still further advantage is that the indicator gage which is the only sensitive component may be readily removed and stored in a safe place when the testing apparatus is idle.

A feature of the preferred practice of the invention is the simplicity of the mechanism for converting input torques into flexure of the beam member. For this purpose a shaft is provided to receive the input torques and a rocker arm on the shaft swings against the flexible beam to convert the torque loads into flexural stressing of the beam. Clockwise torques are applied to one end of the shaft and counter-clockwise torques are applied to the other end of the shaft, the two opposite torques flexing the beam in the same lateral direction. Accuracy in the conversion of input torques into flexure of the beam is promoted by counter-balancing the beam and is further promoted by minimizing friction between the rocker arm and the beam. For this latter purpose a roller is journalled on the flexible beam and rides on a smooth hardened plate on the rocker arm.

A further feature of the invention resides in provisions for calibration of the device. One feature in this regard is the concept of making the position of the indicator gage adjustable lengthwise of the beam so that the longitudinal point of the beam at which the flexure of the beam is sensed may be shifted relative to the fixed end of the beam as required to obtain correct readings with the indicator gage.

Another feature is the concept of providing the indicator gage with a sensing element having a rounded nose in contact with the flexible beam. Since flexure of the beam involves a change in the angle of the beam relative to the sensing element, the point of contact of the beam with the sensing element shifts in accord with the curvature of the contacting surface of the indicator gage. By substituting one radius of curvature for another, the degree of shift of the point of contact may be varied for calibration. Thus with the indicator gage position a given distance from the fixed end of the beam for correct calibration at the upper limit of a range of torque values, a sensing element for the indicating gage of one radius of curvature may be substituted for a sensing element of a different radius of curvature for calibration at an intermediate point in the range of torque values.

The features and advantages of the invention may be understood from the following detailed description and the accompanying drawings.

In the drawings, which are to be regarded as merely illustrative:

FIG. 1 is a side elevational view of the presently preferred embodiment of the invention with a side wall of the housing of the device removed to reveal concealed parts;

FIG. 2 is a plan view of the device as seen along the line 2—2 of FIG. 1 with parts broken away to reveal concealed structure;

FIG. 2a shows how an adapter may be mounted on one end of the input shaft of the device for the purpose of testing a socket wrench;

FIG. 2b is similar view of an adapter that may be used for testing a wrench with a polygonal head;

FIGS. 3, 4, 5 and 6 are enlarged fragmentary side elevational views showing how the indicator gage may be provided with different sensing elements interchangeably for the purpose of calibration; and FIG. 7 is a fragmentary elevational view, partly broken away, illustrating a second embodiment of the invention.

The preferred embodiment of the invention shown in FIGS. 1 and 2 comprises a housing mounted on a base plate 10, the housing having a bottom wall 11, two longitudinal side walls 12, two end walls 14, and a top wall 15, the various walls being secured by suitable means including screws 16. The base plate 10 is apertured to receive suitable cap screws 18 for anchoring the device to a suitable support 20. The principal working parts of the device include an input shaft 22 for the torques that are to be measured, a rocker arm 24 keyed to the shaft, a beam 25 positioned to be flexed by the rocker arm, and a gage 26 of the micrometer-indicator type for sensing the flexure of the beam.

The input shaft 22, which is journalled in suitable ball bearings 28 in the two side walls 12, has a serrated end 30 to receive clockwise torque and a second end 32 to receive counterclockwise torque. The rocker arm 24 has a sleeve portion 34 to embrace the input shaft 22 and is effectively anchored on the shaft by a pair of keys 35 and a set screw 36. It is to be noted that the rocker arm extends longitudinally under the beam 25 in the same direction as the beam with the swinging end of the rocker arm under the free end of the beam. The rocker arm 24 may be suitably counter-balanced, for example, by a tension spring 38 which is anchored by a screw 40 to the outer end of the rocker arm. In the construction shown the upper end of the tension spring 38 is attached to the top wall 15 of the housing by an adjustment screw 42 which is normally immobilized by a lock nut 43. A lower pin 44 serves as a stop to limit the downward movement of the rocker arm 24 and an upper pin 45 limits the upward movement to avoid overloading the beam 25.

The fixed end of the beam 25 may be secured inside the housing in any suitable manner. In the construction shown the fixed end of the beam is clamped between two angular brackets 46 and 48 by a plurality of screws 50, the lower bracket 48 being integral with the adjacent end wall 14 of the housing.

To make sure that all of the applied torque is converted into flexure of the beam 25, it is necessary not only to counterbalance the rocker arm 24 by the spring 38 but also to eliminate friction in the transmission of force from the rocker arm to the beam. This last purpose may be served by suitable anti-friction means interposed between the rocker arm and the beam. In this particular embodiment of the invention, a smooth hard roller 52 is mounted by suitable bearings on a bracket 54 at the outer end of the beam 25, and the roller rides on a hard smooth wear plate 55 that is attached to the upper side of the swinging end of the rocker arm 24.

The gage 26 is a well known type of micrometer-indicator, the particular gage shown in FIG. 1 being known commercially as an "Ames" gage having a null adjustment 56. Preferably the gage has a main scale 58 traversed by a relatively long pointer 60 and a smaller auxiliary scale 62 traversed by a smaller pointer 64, the larger scale having a range of 200 increments and the smaller scale indicating the number of revolutions of the long pointer. The scale may represent any desired torque values such as ounce-inches or pound-inches.

The gage 26 has the usual tubular shank 65 with a sensing plunger 66 extending retractibly from the shank into contact with the upper surface of the beam 25. For the purpose of the present embodiment of the invention a collar 68 of stepped configuration is mounted on the shank 65 by means of a set screw 70, the purpose of the collar being to fit into a suitable seat in the top wall 15 of the housing. For the purpose of calibration the seat for the indicator 26 should be adjustable on the top wall 15 in a direction longitudinally of the beam 25.

In the construction shown the top wall 15 of the housing has a rectangular opening 72 that extends lengthwise of the top wall to receive a corresponding but shorter metal block 74 that is adjustable longitudinally in the rectangular opening. The metal block 74 is mounted by suitable screws 75 on the underside of a rectangular plate 76 that is larger in width and length than the rectangular opening 72. Thus with the rectangular plate 76 resting on the top housing wall 15 and with the block 74 extending downward therefrom through the rectangular opening 72, the rectangular plate may be adjusted through a range of longitudinal positions relative to the top wall 15. The rectangular plate is shifted as required for calibration and is then anchored at the adjusted position by means of screws 78 that extend through the rectangular plate into the top wall 15. The metal block 74 and the rectangular plate 76 have registered bores for the indicating gage 26, the two bores forming a seat of stepped configuration to receive the stepped collar 68 of the indicating gage.

A feature of the invention is that the indicating gage 26 is of the memory type which in any gaging operation maintains the reading of the maximum displacement of the sensing plunger 66. The reading is maintained until a release button 84 is manually depressed to return the two pointers 60 and 64 to their normal zero positions.

The manner in which the invention functions to serve its purpose may be readily understood from the foregoing description. It is apparent that either a clockwise torque applied to the shaft end 30 or a counter-clockwise torque applied to the shaft end 32 will swing the rocker arm 24 upward to cause corresponding flexure of the beam 25 in accord with the magnitude of the torque. With the indicator gage 26 calibrated in terms of units of torque, the magnitude of the applied torque may be read directly from the gage. It is to be noted that since the gage maintains the highest reading which results from displacement of the sensing plunger 66, the gage does not respond to the return movement of the beam 25 when the applied torque is removed from the beam. Thus if a torque limiting wrench is applied to the shaft 22 and "breaks" when the predetermined torque is reached, the flexed beam 25 snaps back to its normal unstressed position, but since the movement of the released beam is away from the sensing plunger 66 and since the sensing plunger remains retracted until the release button 84 is depressed, the delicate mechanism of the indicator gage 26 is not affected.

FIG. 2a shows how an adapter 84 may be mounted on the end 30 of the shaft 22 to cooperate with a torque limiting socket wrench 86 and FIG. 2b shows how another adapter 88 may be mounted on the shaft end to cooperate with the polygonal head 90 of a torque limiting wrench 92.

For calibration the maximum torque of the desired range of torques may be applied to the shaft 22, and with the rectangular plate 76 freely slideable on the top wall 15 of the housing, the rectangular plate with the gage 26 carried thereby may be shifted longitudinally of the rectangular opening 72 of the top housing wall 15 until a position is found at which the gage 26 indicates the predetermined maximum torque. Then the maximum torque is removed and a selected intermediate torque which may be at the midpoint of the range is applied to the shaft 22. If the gage 26 does not register the selected intermediate torque accurately, the sensing plunger 66 may be replaced by a sensing plunger having a nose of a different curvature. It may be necessary then to check the maximum torque again, the maximum and intermediate torques being checked alternately with adjustments made accordingly until calibration is achieved.

FIGS. 3–6 show how a set of interchangeable sensing plungers may be used, the noses of the different sensing plungers having different radii of curvature to contact the beam 25. FIG. 3 shows how the usual sensing plunger 66 has a nose 94 of a given radius of spherical curvature. The sensing plunger 66a of FIG. 4 has an enlarged nose 95 of a substantially larger radius of curvature. The sensing plunger 66b of FIG. 5 has a nose 96 in the form of a flat disk. The nose 66c of FIG. 6 is tapered to a nose 98 having an exceedingly small radius of curvature.

The manner in which the point of contact of the nose 95 with the beam 25 shifts with upward flexure of the beam is indicated in FIG. 4. At the normal position of the beam 25 when the beam is not under stress, the point of contact of the sensing plunger with the beam is along the axis 100 of the sensing plunger 66a. When the beam 25 is flexed upwardly the point of contact shifts to the line 102. It is apparent that with a nose of large curvature as shown in FIG. 4 the amount of shift of the point of contact is greater than with a nose of smaller radius, for example the nose 94 in FIG. 3.

If the sensing plunger 66b is used the point of contact of the beam 25 with the sensing plunger shifts to the outer circumference of the nose at the line 104. If the tapered sensing plunger 66c of FIG. 6 is used, the shift of the point of contact of the beam with the nose of the sensing plunger shifts by only an exceedingly small amount when the beam is flexed.

The second embodiment of the invention shown in FIG. 7 is largely identical with the first embodiment as may be seen, the only difference being in the manner that flexure of the beam 25a is converted into displacement of the sensing plunger 66 of the indicator gage 26. The indicator gage 26 is suitably immobilized in an end wall 14 of the housing with the sensing plunger 66 directed towards the beam 25a. The beam 25a is provided with a cam 106 on its end for cooperation with the sensing plunger 66, the cam having a cam face 108 of curved configuration for linear displacement of the sensing plunger 66.

My description in specific detail of the selected embodiments of the invention will suggest various changes, substitutions and other departures from my disclosure within the spirit and scope of the appended claims.

I claim:

1. In a torque measuring device, the combination of:
   a beam member free and unhindered at one end and rigidly anchored at the other end;
   means to convert an input torque to be measured into a force directed against the beam member laterally thereof with consequent flexure of the free end of the beam member; and
   a gage adapted to measure the degree of flexure of the beam.

2. A combination as set forth in claim 1 in which said gage is of the micrometer-indicator type.

3. A combination as set forth in claim 1 in which said gage is resettable gage adapted to indicate its maximum displacement by the beam member and to maintain such indication until it is reset.

4. A combination as set forth in claim 1 in which said gage is positioned adjacent the free end of the beam and in which the free end of the beam has a transverse cam surface in operating contact with the gage.

5. In a torque measuring device, the combination of:
   a beam member free at one end and rigidly anchored at the other end;
   means including a force-applying member to convert an input torque into a force against said beam member for flexure thereof;
   rotary means journalled on the beam in rolling contact with the force-applying member to transmit force from the force-applying member to the beam member; and
   a sensitive indicating gage to measure the flexure of the beam member.

6. A combination as set forth in claim 1 in which said indicating gage has a sensing element with a rounded surface in contact with the beam member.

7. In a torque measuring device, the combination of:
   a beam member free at one end and rigidly anchored at the other end;
   a rocker arm to receive an input torque to be measured, said rocker arm having a swinging end and being positioned adjacent the beam lengthwise of the beam with the swinging end of the rocker arm adjacent the free end of the beam for applying force to flex the free end of the beam;
   anti-friction means interposed between the rocker arm and the beam to transmit force from the rocker arm to the beam to deflect the beam; and
   a sensitive micrometer-indicator gage responsive to flexure of the beam, said gage being calibrated in terms of torque units.

8. A combination as set forth in claim 7 which includes counter-balance means for said rocker arm.

9. In a torque measuring device, the combination of:
   a beam member free and unhindered at one end and rigidly anchored at the other end;
   means to convert an input torque to be measured into a force directed against said beam member laterally thereof with consequent flexure of the free end of the beam member;
   a fixed support structure adjacent the beam member and extending longitudinally thereof; and
   a sensitive indicating gage on said support structure in contact with said beam to measure the flexure of the beam in terms of units of torque,
   said indicating gage being adjustable in position longitudinally of the fixed structure for calibration.

10. In a torque measuring device, the combination of:
    a support structure having an elevated substantially horizontal longitudinal member;
    a beam fixedly attached at one of its ends to said support structure, the other end of the beam being free and unimpeded, said beam being spaced under said member and extending longitudinally thereof;
    means pivotally mounted on said fixed structure to swing against said beam to flex said beam upward in response to an input torque to be measured; and
    an indicating gage removably mounted on said elevated member and extending downward therefrom to measure the flexure of the beam in terms of units of torque.

11. A combination as set forth in claim 10 in which said elevated member has a seat therein and said indicating gage rests in said seat in a position extending downward therefrom.

12. In a torque measuring device, the combination of:
    a support structure;
    a beam anchored at one of its ends to said support structure with the other end of the beam free and unhindered;
    a shaft member journalled on said support structure with the opposite ends of the shaft member accessible for the application thereto selectively of an input torque to be measured;
    means operated by said shaft member to flex said beam in response to an input torque; and
    an indicator gage mounted on said support structure to respond to flexure of the beam.

13. In a torque measuring device, the combination of:
    a support structure;
    a beam member anchored at one of its ends to said support structure;
    a shaft journalled on said support structure with the opposite ends of the shaft accessible for the application thereto selectively of an input torque to be measured;
    an arm member on said shaft adjacent said beam;
    a hard smooth element on said arm member;
    rotary means journalled on the beam member in rolling contact with said element to transmit force from the arm member to the beam member; and
    a sensitive indicating gage mounted on said fixed structure to measure the flexure of the beam.

References Cited by the Examiner

UNITED STATES PATENTS

| | | | |
|---|---|---|---|
| 2,635,453 | 4/53 | Gentry et al. | 73—1 |
| 2,706,903 | 4/55 | Livermont | 73—1 |
| 2,945,374 | 7/60 | Simmons | 73—1 |

ISAAC LISANN, *Primary Examiner.*
ROBERT B. HULL, *Examiner.*